(12) United States Patent
Tucker et al.

(10) Patent No.: US 6,249,671 B1
(45) Date of Patent: Jun. 19, 2001

(54) AESTHETIC ENCLOSURE FOR A WIRELESS NETWORK ACCESS POINT

(75) Inventors: John W. Tucker, Flowery Branch; Richard A. Clark, Atlanta; William H. Roeder, Norcross; Steven B. Flemig, Woodstock, all of GA (US)

(73) Assignee: LXE, Inc., Norcross, GA (US)

( * ) Notice: Subject to any disclaimer, the term of this patent is extended or adjusted under 35 U.S.C. 154(b) by 0 days.

(21) Appl. No.: 09/092,621

(22) Filed: Jun. 5, 1998

(51) Int. Cl.[7] .................................................... H04Q 7/36
(52) U.S. Cl. ............................. 455/90; 361/694; 361/707
(58) Field of Search .................................... 361/687, 696, 361/700, 725, 726, 728, 683, 688, 694, 707, 695; 114/211; 312/223, 107.5; 220/4.33, 3.7, 4; 455/90, 575; 343/707, 795

(56) References Cited

U.S. PATENT DOCUMENTS

| | | | |
|---|---|---|---|
| 4,711,193 | * 12/1987 | Latza et al. ............................ | 114/211 |
| 4,744,005 | * 5/1988 | Milani .................................... | 361/687 |
| 5,067,040 | * 11/1991 | Fallik ..................................... | 361/687 |
| 5,486,982 | * 1/1996 | Hsu ........................................ | 361/728 |
| 5,555,156 | * 9/1996 | Decante ................................. | 361/683 |
| 5,595,316 | * 1/1997 | Gallarelli et al. .................... | 220/4.33 |
| 5,694,335 | * 12/1997 | Hollenberg ............................ | 713/201 |
| 5,737,189 | * 4/1998 | Kammersgard et al. ............. | 361/726 |
| 5,739,791 | * 4/1998 | Barefield et al. ..................... | 343/702 |
| 5,978,217 | * 11/1999 | Kerrigan et al. ...................... | 361/694 |

* cited by examiner

*Primary Examiner*—William G. Trost
*Assistant Examiner*—Jean A. Gelin
(74) *Attorney, Agent, or Firm*—Kilpatrick Stockton LLP

(57) ABSTRACT

A wireless network access point enclosure sized to fit in place of a panel in a standard hanging acoustical-panel ceiling. The enclosure includes a sealed pan that houses the network access point outside the room space, typically in the building space above the ceiling. The enclosure is designed to meet fire code regulations that apply to devices placed within a building's air-handling space. The enclosure includes a ventilated cover that mounts to the pan. The cover is substantially flush with the ceiling when attached to the pan. Only a small antenna, which mounts to a receptacle in the cover, extends into the room space. Power and communications cables for the network access point may be routed above the ceiling and through a cable receptacle in the pan. The enclosure also includes a plate within the enclosure for mounting the network access point and maintaining a ventilation space between the device and the enclosure pan. The ventilated cover and the mounting plate keep the network access point from overheating while the sealed pan forms a substantially sealed smoke barrier that meets fire code regulations.

20 Claims, 2 Drawing Sheets

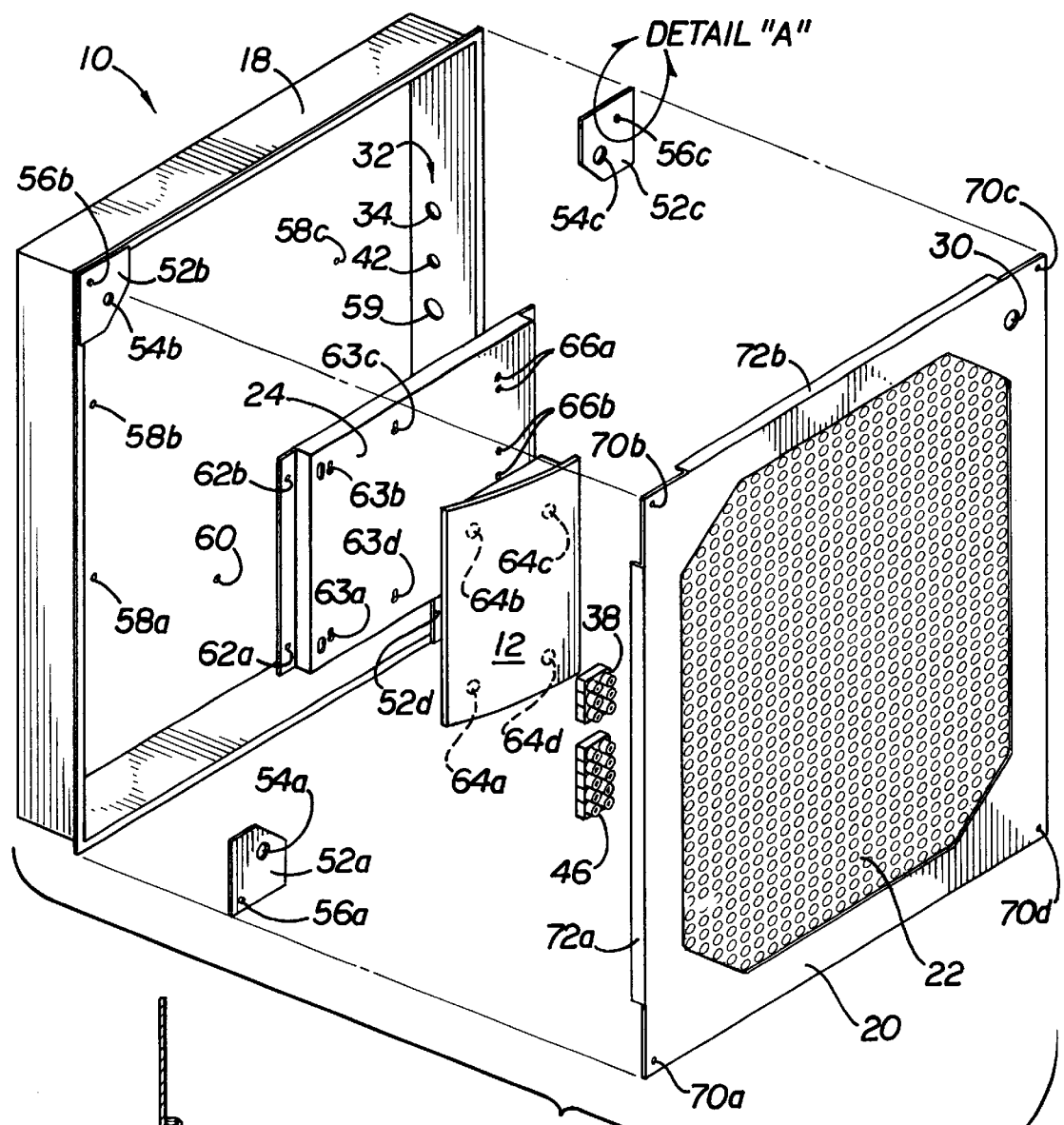
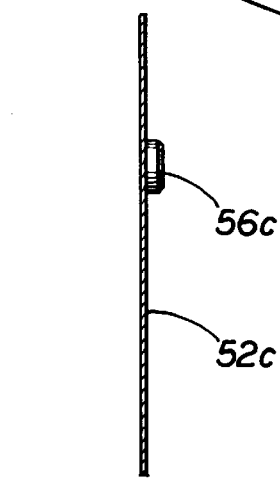
FIG 3
FIG 4

AESTHETIC ENCLOSURE FOR A WIRELESS NETWORK ACCESS POINT

TECHNICAL FIELD

This invention relates generally to the field of computer device enclosures and, more particularly, to an aesthetic enclosure for a wireless network access point for placement in an interior building structure.

BACKGROUND OF THE INVENTION

Wireless terminals may be deployed in many settings, such as medical care facilities, warehouses, freight loading centers, office parks, research and development facilities, military bases, and so forth. For example, wireless terminals are particularly well suited to medical care environments, such as hospitals, clinics, nursing homes, and doctors' offices. Here, they offer the great advantage of replacing the traditional clipboard hanging from a patient's bed frame with a computer terminal that uses radio-frequency transmissions to communicate with a distributed computer network. These wireless terminals bring bedside medical care into the information age by computerizing medical charts. They also make it much easier for a doctor to remotely monitor a patient's condition and issue health care instructions.

In a medical care environment, a wireless terminal operates as the bedside component of a distributed patient-care computer network that might include computer resources and terminals located throughout a hospital system. This patient-care computer network might also extend to other hospital systems, the offices of the doctors that practice in the hospital, the offices of the insurance company, and so forth. The wireless terminal is typically used to post and record the information that was traditionally posted and recorded on a bedside clipboard, such as the patient's prescriptions, vital signs, receipt of medications, scheduled tests, etc. This and other information is now automatically communicated between the wireless terminal and the distributed patient-care computer network.

As an example, consider a doctor who has patients in several different hospitals. The doctor may access the wireless terminals assigned to these patients by way of any terminal of the patient-care computer network, such as a terminal located at the doctor's home or office. In fact, the patient-care computer network might be remotely accessible from virtually any location, even a golf course or sailboat, using a cellular telephone and a laptop computer.

This type of patient-care computer network allows an off-site doctor to remotely access several wireless terminals that are in different locations without having to travel to the different locations or place telephone calls to on-site practitioners at the different locations. An on-site practitioner, such as floor a nurse or on-duty doctor, simply refers to a patient's assigned wireless terminal to learn of the off-site doctor's instruction for the patient.

The on-site practitioner making the rounds usually picks-up the appropriate wireless terminal before visiting the patient and takes the terminal into the patient's room. The on-site practitioner then performs the indicated tasks and enters any relevant information into the wireless terminals, such as test results, vital signs, observations, and the like. The wireless terminal automatically transmits the patient's information to the patient-care computer network. When the visit with the patient is over, the on-site practitioner typically returns the wireless terminal to its storage location. The off-site doctor can later access the information received from the wireless terminal to confirm that the instructions were carried out, further monitor the patient's condition and, if required, alter the care instructions.

Deploying a wireless terminal in this type of medical care environment typically involves placing a wireless network access point within each hospital room. The network access point, which integrates the wireless terminal with the distributed patient-care computer network, allows the wireless terminal to conduct wireless communications with the computer network while the medical practitioner uses the wireless terminal within the hospital room. The network access point typically receives a power cable and a communications cable that connects the network access point to the computer network. The network access point also typically includes an antenna for conducting wireless communications with the wireless terminal.

To avoid interference and ensure that only one network access point attempts to communicate with a particular wireless terminal, the network access point and the wireless terminal typically use a very low-power, high-frequency radio signal. As this signal remains effectively confined within the room in which the wireless terminal is located, the network access point antenna must typically be located within the same room. Locating the network access point itself inside the room, however, is considered aesthetically unacceptable by many hospitals. In particular, mounting the network access point on a hospital-room wall and running cables to the device along the wall is generally unacceptable.

A number of enclosures have been developed for network access points in an attempt to provide an aesthetically acceptable deployment. For example, enclosures including domes, globes or box-shaped housings that extend from a wall or the ceiling into the room space have been developed to house network access points. Although this type of enclosure conceals the network access point, the enclosure can be quite expensive and still intrudes into the room space. Many hospitals therefore find these enclosures to be an unacceptable solution.

Alternatively, network access points have been placed above the ceiling, for example on top of an acoustical-panel ceiling structure. But this solution may also be unacceptable because the building space above the ceiling is often used as an air-handling space, for example to supply return air to the building's heating, ventilation, and air-conditioning (HVAC) system. Fire codes applicable to such air-handling spaces typically prohibit simply placing a network access point on top of an acoustical-panel ceiling structure. A freestanding network access point placed on top of a ceiling structure may present a falling-object safety hazard because the device could fall through the ceiling if the panels become wet or if the building experiences an earthquake or other disturbance.

Thus, there exists a need in the art for an aesthetically acceptable enclosure for housing a network access point in an interior building structure, such as a wall or ceiling of a hospital room.

SUMMARY OF THE INVENTION

The present invention meets the need described above in an enclosure for housing a computer device, such as a wireless network access point, in an interior building structure, such as a wall or ceiling of a hospital room. The enclosure includes a sealed pan that houses the computer device outside the room space, typically in the building space above the ceiling of the hospital room. As this space is often used as an air-handling space, for example to provide return air to the building's HVAC system, devices and enclosures placed in this space may be subject to restrictive fire code regulations. The enclosure includes a ventilated cover and a mounting plate within the enclosure that keeps the computer device from overheating while the sealed pan forms a substantially sealed smoke barrier that meets these fire code regulations.

Generally described, the invention is an enclosure for a computer device. The enclosure includes a substantially sealed pan configured for placement within a structural member defining a substantially planar surface, such as a wall or ceiling, adjacent a room space. The pan, which defines an enclosure space for housing the computer device outside the room space, does not extend substantially into the room space when placed within the structural member. The pan includes a cable receptacle for receiving one or more cables for connecting the computer device to a computer network. The cable receptacle typically includes a first hole for a power cable and a second hole for a network communications cable.

The enclosure also includes a cover that may include a number of ventilation holes. When the cover is attached to the pan, the outer surface of the cover is substantially flush with the planar surface. Thus, the cover does not extend substantially into the room space when the cover is attached to the pan. The enclosure may be placed between a room space and a building space. In the case, the pan is substantially sealed to form a smoke barrier between the enclosure space and the building space. For example, building space may be an air-handling space for a public building, and the pan may be designed to meet fire code regulations governing placement of the enclosure within the air-handling space of the public building.

The enclosure may also include an antenna receptacle for receiving an antenna cable from an antenna located outside the enclosure space for connection to the computer device. The antenna, which is operable for wireless communications with the computer device, may be supported by the enclosure exterior to the enclosure space. For example, the antenna receptacle may be configured to support the antenna within the room space.

The pan may also define a rear surface, and the enclosure may include a plate that attaches to the pan or to the cover and maintains a ventilation space between the computer device and the rear surface of the pan. For example, the plate may attach to the rear surface of the pan. The ventilation space between the computer device and the rear surface of the pan helps to keep the computer device from over heating.

To assist in maintenance, the pan may include impressed screw holes defining threaded channels for receiving self-tapping screws for removably attaching the cover to the pan. The impressed screw holes allow a technician to attach and remove the cover from the pan while the technician is substantially located within the room space. Similarly, the pan may include impressed screw holes defining threaded channels for receiving self-tapping screws for removably attaching the plate to the pan. This allows the technician to attach and remove the plate from the pan while the technician is substantially located within the room space. To further assist in maintenance, the plate may include keyhole-shaped mounting holes for receiving mounting pins attached to the computer device. Thus, the technician may attach and remove the computer device from the enclosure while the technician is substantially located within the room space.

In addition, the cover may be configured to attach to the pan in a number of positions. In this case, the pan may include a plurality of corner brackets with each corner bracket including an antenna receptacle configured to align with the antenna receptacle of the cover when the cover is attached to the pan in a particular one of the positions.

More specifically described, the invention is an enclosure for a wireless network access point configured for placement within a ceiling structure that includes a grid of rails supporting a number of panels that define a substantially planar ceiling surface between a room space and a building space. The pan is configured for receipt on top of a portion of the rails configured to support one of the panels. The pan is substantially sealed to create a smoke barrier between the enclosure space and the building space. The pan defines an enclosure space for housing the network access point outside the room space such that the pan does not extend substantially into the room space when the pan is received within the ceiling structure. The pan also includes a cable receptacle for receiving a power cable and a network communications cable for connecting the network access point to a computer network.

The enclosure also includes a ventilated cover that attaches to the pan. The cover includes an outer surface that is substantially flush with the planar ceiling surface when the cover is attached to the pan such that the cover does not extend substantially into the room space when the cover is attached to the pan. The enclosure also includes a plate that attaches to the pan for mounting the network access point within the enclosure space and maintaining a ventilation space between the network access point and the rear surface of the pan. The enclosure also includes an antenna receptacle configured to support an antenna within the room space. The antenna is operable for wireless communications with the network access point.

That the invention provides an aesthetically acceptable enclosure for housing a network access point in an interior building structure will become apparent from the following detailed description of the exemplary embodiments of the invention and the appended drawings and claims.

BRIEF DESCRIPTION OF THE DRAWING

FIG. 3 is an exploded perspective view of the enclosure shown in FIG. 1.

FIG. 4 is an enlarged cross-sectional detail view of a corner bracket of the enclosure shown in FIG. 1.

DETAILED DESCRIPTION OF EXEMPLARY EMBODIMENTS

The present invention may be embodied in an enclosure for housing a wireless network access point in an interior building structure, such as a wall or ceiling of a hospital room. Although the enclosure is specifically designed to house a network access point, other types of computer devices, such as cellular telephone devices, security monitoring devices, intercom devices, and so forth, could also be placed within the enclosure. The enclosure includes a sealed pan that houses the network access point outside the room space, typically in the building space above the ceiling of the hospital room. As this space is often used as an air-handling space, for example as to provide return air to the building's HVAC system, devices and enclosures placed in this space may be subject to restrictive fire code regulations. The sealed pan allows the enclosure to meet these fire code regulations.

The enclosure also includes a ventilated cover that mounts to the pan. The cover is substantially flush with the ceiling when attached to the pan. Only a small antenna, which typically mounts to a receptacle in the cover, extends into the room space. The power and communications cables for the network access point may be routed above the ceiling and through a cable receptacle in the pan. The enclosure may also include a plate within the enclosure for mounting the network access point and maintaining a ventilation space between the device and the enclosure pan. The ventilated cover and the mounting plate keep the network access point from overheating while the sealed pan forms a substantially sealed smoke barrier to satisfy applicable fire code regulations.

The pan is preferably sized to fit in place of a panel in a typical hanging acoustical-panel ceiling. The cover attaches to the pan to form a substantially flush surface with the acoustical panels adjacent to the enclosure. As the enclosure does not intrude into the room space, the enclosure has an aesthetically pleasing appearance that is acceptable in many hospitals and other types of buildings. The cover and plate attach to the pan using self-tapping screws so that once the enclosure is installed, it may be accessed from within the room space. For example, the cover and plate may be removed and another plate, configured for mounting a different network access point, may be installed by a technician located within the room space without having to remove the pan from the ceiling.

Figure 1:
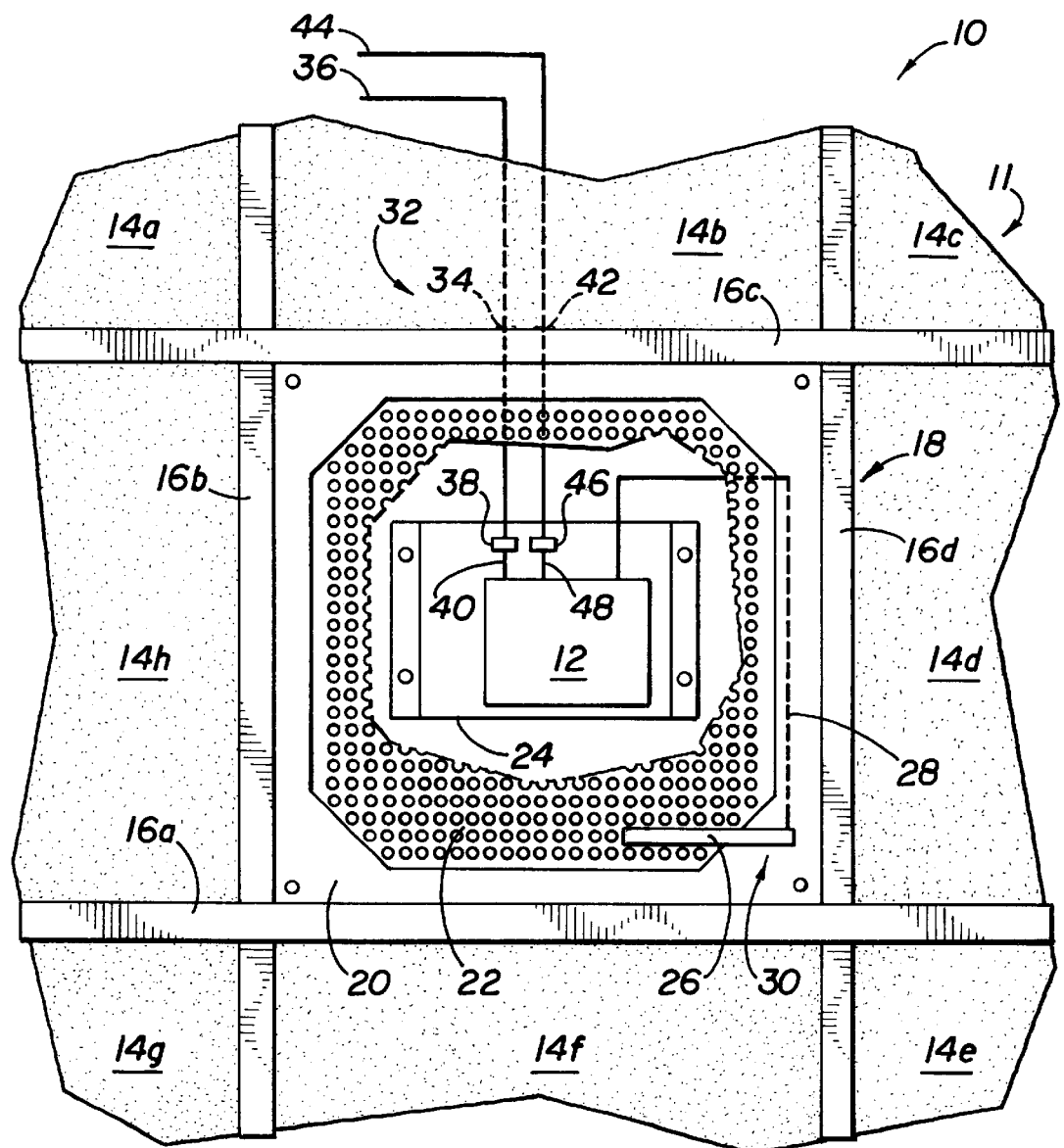
FIG. 1 is front view of a wireless network access point enclosure placed within an acoustical ceiling structure in accordance with an exemplary embodiment of the invention.

Exemplary embodiments of the invention will now be described with reference to the drawings, in which like numerals refer to like elements throughout the several figures. FIG. 1 is front view of a wireless network access point enclosure 10 placed in an acoustical ceiling structure 11 in accordance with an exemplary embodiment of the invention. The ceiling structure 11 defines a substantially planar surface that separates a room space below the ceiling structure from a building space above. The enclosure 10 defines an enclosure space for housing a network access point 12 outside the room space. In this example, the enclosure 10 is configured to house the network access point 12 in the building space above the ceiling structure 11. In the example shown in FIG. 1, the enclosure 10 is specifically configured to house a RANGELAN2 7500 Series Access Point manufactured by PROXIM, INC. of Mountain View Calif., but may be configured to house similar devices manufactured by other vendors.

The enclosure 10 is sized and otherwise configured for placement within a standard acoustical-panel ceiling represented the panels 14a–h. These panels are supported by a grid of rails, represented the rails 16a–d, that are usually supported from above by guy wires. The panels are typically manufactured in standard sizes of approximately 48 inches (122 cm) by 24 inches (61 cm) (sometimes called "full-sized" panels) and 24 inches (61 cm) by 24 inches (61 cm) (sometimes called "half-sized" panels). The enclosure 10 is sized to fit on top of a portion of the rails 16a–d configured to receive a standard half-sized panel. Although the enclosure 10 is specifically designed for placement within this type of standard acoustical-panel ceiling structure, the enclosure could equivalently be placed within other standard panel ceilings, within other types of ceilings, or within other interior building structures, such as the walls or the floor, if desired.

The enclosure 10 includes a pan 18 sized to fit on top of the rails 16a–d instead of a standard half-sized panel. The pan 18 is sealed to form a smoke barrier between the room space below the ceiling structure 11 and the building space above. That is, the pan 18 is sufficiently sealed to prevent a significant amount of the smoke that would be created by burning the network access point 12 from passing through the pan. More specifically, the pan 18 is preferably sealed to the extent required to allow placement of the enclosure 10 within an air-handling space, such as the return-air space for the HVAC system of a public building, such as a hospital.

The enclosure 10 also includes a ventilated cover 22 that may be attached to and removed from the pan 18 while the pan is in place on top of the rails 16a–d. The cover includes a perforated section 22 that includes a grid of ventilation holes. These holes allow ambient air from the room below, which is typically temperature controlled, to ventilate the network access point 12 and thus keep it from overheating. The ventilation holes also allow a technician located within the room to view lights or other status indicators on the network access point 12. A small electric fan could be located within the enclosure if additional ventilation is desired. For example, the electric fan could be attached to the cover 22 and powered by the same electrical service that powers the network access point 12.

The enclosure 10 also includes a plate 24 for mounting the network access point 12. The plate 24 further helps to ventilate the network access point 12 by maintaining a ventilation space between the device and the pan 18. In this example, the plate 24 attaches to the rear panel of the pan, which is the surface of the pan 18 that is parallel to and set back from the cover 20. Although the plate 24 preferably attaches to the rear panel of the pan, the plate 24 may alternatively attach to the cover or to the sides of the pan 18.

The network access point 12 is functionally connected to an antenna 26, such as a 3–6 dB bidirectional antenna, by way of an antenna cable 28. The antenna 26, which allows the network access point 12 to communicate via 2.4 GHz radio-frequency signals with a wireless terminal located within the room space, is preferably supported by the enclosure 10 outside the enclosure space. Specifically, the cover 20 preferably includes an antenna receptacle 30 that supports the antenna 26 within the room space. For example, the antenna receptacle 30 may be a hole through the cover 20 that allows the antenna cable 28 to pass through the cover. The antenna 26 may then be secured to the antenna receptacle 30 using a standard cable mounting so that the antenna 26 is suspended by a short length of the antenna cable 28 within the room space.

Although the antenna 26 is preferably suspended below the ceiling structure 11 within the room space, the antenna 26 may equivalently be supported elsewhere, such as within the enclosure space, in the building space above the ceiling structure 11 on the outside of the pan 18, or on the ceiling structure. In particular, the antenna 26 is preferably suspended within the room space to minimize the power required for the radio-frequency signal between the network access point 12 and a wireless terminal located within the room space. If a slightly higher-power signal or lower-frequency signal is used, however, the antenna 26 may be placed behind the cover 20 or behind one of the panels 18 of the ceiling structure 11. If the antenna 26 is located behind the cover 20, then the cover may be constructed from a non-metallic material that allows the radio-frequency to substantially propagate through the cover.

The pan 18 also includes a cable receptacle 32 that allows one or more cables to pass through the pan for connection to the network access point 12. Specifically, the cable receptacle 32 includes a first hole 34 that allows a power cable 36 to pass through the pan 18. The power cable 36 may be connected to an electric power source, such as a standard 10–18 Volt DC non-interruptable, fault-protected power supply. The power cable 36 may terminate in a conventional connector that attaches directly to a port on the network access point 12. Alternatively, power cable 36 may connect to a terminal block 38 that is mounted on the plate 24. In this case, the terminal block 38, in turn, is connected to a local power cable 40 that connects the power supply to the network access point 12.

The cable receptacle 32 also includes a second hole 42 that allows a communications cable 44 to pass through the pan 18. The communications cable 44 may be connected to a distributed computer network, such as a local-area network, a wide-area network, an intranet, an Ethernet, the Internet, or the like. To avoid interference, the communications cable 44 may terminate in a conventional connector that attaches directly to a port on the network access point 12. Alternatively, the communications cable 44 may connect to a terminal block 46 that is mounted on the plate 24. In this case, the terminal block 46, in turn, is connected to a local communications cable 48 that connects the communications cable 44 to the network access point 12. The cable receptacle 32 may also include additional holes, such holes sized for one or more standard antenna cables. The holes 36 and 44, as well as any other holes provided through the pan 18, are preferably sealed with a suitable cable mounting, gasket, or caulking material when a cable is received through the hole. Each hole is preferably filled with a UL-approved plug when a cable is not received through the hole.

The terminal blocks 38 and 46 allow the network access point 12 and the plate 24, which may include mounting holes specifically configured for its respective network access point, to be quickly swapped out for a replacement network access point, which may mount to different plate. To assist in maintenance, the cover 20 and the plate 24 typically attach to the pan 18 using self-tapping screws so that once the enclosure 10 is installed within the ceiling structure 11, the internal components of the enclosure 10 may be accessed for maintenance from within the room space. For example, the cover 20 and the plate 24 may be removed and another plate, configured for mounting a different network access point, may be installed by a technician located within the room space without removing the pan 18 from the ceiling structure 11.

Figure 2:
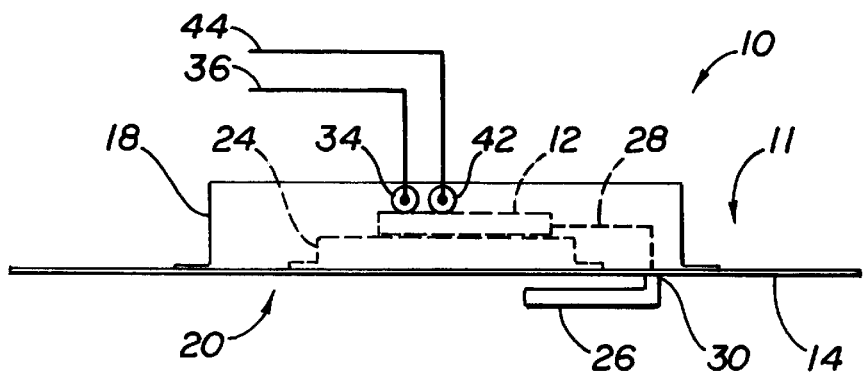
FIG. 2 is side view of the enclosure shown in FIG. 1.

FIG. 2, which is side view of the enclosure 10 shown in FIG. 1, illustrates certain aspects of the enclosure that may not be readily apparent from FIG. 1. Specifically, FIG. 2 shows that the pan 18 of the enclosure 10 preferably sits on top of a portion of the rails, represented by the rails 16b and 16d. As noted previously, the pan 18 is configured to fit within the rail-defined space intended for a standard half-sized ceiling panel. To provide further physical support, particularly in earthquake-prone regions, the pan 18 may by supported from above by one or more guy wires similar to the guy wires that support the rails of the ceiling structure 11. In this case, the pan 18 may include additional holes for connecting eye bolts for the guy wires to the pan. FIG. 2 also shows that the plate 24 is raised above the rear surface of pan 18 to maintain a ventilation space between the network access point 12 and the rear surface of the pan.

FIG. 3 is an exploded perspective view of the enclosure 10 shown in FIG. 1. FIG. 3, which is shown to scale, illustrates certain details of the enclosure 10 that may not be readily apparent from FIGS. 1 and 2. The pan 18 includes four corner brackets 52a–d (corner brackets 52a–c are shown), that may be spot welded to the body of the pan. Each corner bracket 52a–d includes an antenna receptacle 54a–d, respectively (antenna receptacles 54a–c are shown). The four antenna receptacles 54a–d are configured to align with antenna receptacle 30 of the cover 20 when the cover is attached to the pan 18 in each of four different rotational positions.

Having multiple corner brackets with associated antenna receptacles allows the antenna cable 28 to extend through one of the corner brackets, which aligns with the antenna receptacle 30 in the cover 20, when the cover is attached to pan 18 in any of the four rotational positions. The antenna receptacles of the corner brackets thus allow a technician to change the position of the antenna 26 from one corner bracket to another without having to remove the pan 18 from its position within the ceiling structure 11.

Each corner bracket 54a–d also includes an impressed screw hole 56a–d, respectively (impressed screw holes 56a–c are shown). Each screw hole is positioned within its respective corner bracket such that the rails 16a–d will not cover the screw hole when the pan 18 is installed within the rails. FIG. 4 shows an enlarged cross-sectional view of Detail "A" of a representative one of the screw holes 56c. To assist in maintenance, the screw holes 56a–d are impressed into the pan 18 and define channels that are threaded for receiving self-tapping screws for removably attaching the cover 20 to the pan. The impressed screw holes allow a technician to attach and remove the cover 20 from the pan 18 while the technician is substantially located within the room space.

The pan 18 also includes four impressed screw holes 58a–d (impressed screw holes 58a–c are shown) that are threaded for receiving self-tapping screws for removably attaching the plate 24 to the pan. The pan 18 also includes a fifth impressed screw hole 60 preferably marked "ground" and threaded for receiving a self-tapping screw for attaching a ground wire from the network access point 12 to the pan 18. The rails 16a–d, in turn, are connected to the building ground. As noted previously, the pan 18 includes a cable receptacle 32 including a first hole 34 for receiving a power cable and a second hole 42 for receiving a communications cable. The cable receptacle 32 may also include auxiliary holes, represented by the auxiliary hole 59, for receiving additional cables or power and communications cables of other sizes. For example, the cable receptacle 32 may include two auxiliary holes, a first auxiliary hole for an antenna cable having a first standard diameter, and a second auxiliary hole for an antenna cable having a second standard diameter.

The plate 24 includes four non-threaded screw holes 62a–d (non-threaded screw holes 62a–b are shown), which align with the threaded holes screw holes 58a–d in the pan 18. The plate 24 also includes four keyhole-shaped holes 63a–d for removably receiving four mounting pins 64a–d located on the bottom side of the network access point 12. The plate 24 includes screw holes 66a and 66b for attaching the terminal blocks 38 and 46, respectively, to the plate.

The cover 20 includes four non-threaded screw holes 70a–d, which align with the threaded holes screw holes 56a–d in the corner brackets 52a–d, respectively. The cover 20 also includes four flanges, represented by the flanges 72a–b, that extend along a portions of its outer edges. The flanges extend inside the pan 18 when the cover is attached to the pan to facilitate aligning the non-threaded screw holes 70a–b with the threaded holes screw holes 56a–d in the corner brackets 56a–d, respectively.

The dimensions and materials of a typical enclosure 10 are as follows. Of course, the specific dimensions and materials are exemplary, and may be varied somewhat within the scope of the invention. The pan 18 is 23.75 inches (60.3 cm) square and 3.0 inches (7.6 cm) deep with a 0.375 inch (0.95 cm) flange around its perimeter. The corner seams of the pan 18 are spot welded or filled with a suitable caulking material to seal the pan, which forms a smoke barrier to meet fire code regulations UL2043 for placement of the enclosure within the air-handling space of a public building, such as a hospital. All holes in the pan 18 that receive cables are sealed with a suitable cable mounting, gasket, or caulking material. All holes in the pan 18 that are not filled with screws or cable mountings are filled with UL-approved plugs.

The cover 22 is 22.625 inches (57.6 cm) square with 0.5 inch (1.27 cm) deep flanges extending along the center 17.5 (44.5 cm) portions of each outer edge. The perforated portion 22 of the cover 24, which may be a separate piece spot welded to an outer frame section, includes 0.125 inch (0.318 cm) diameter ventilation holes on 0.2 inch (0.508 cm) square spacing. The plate 24 is 15.0 inches (38.1 cm) by 9.0 inches (22.9 cm) with a center section 13.0 inches (33.0 cm) by 9.0 inches (22.9 cm) raised 0.75 inches (1.9 cm) above 1.0 inch (2.54 cm) flanges on either end. The corner brackets 52a–d are 3.0 inches (7.6 cm) square with one corner 1.25 inches (3.2 cm) by 1.25 inches (3.2 cm) along the outer edges removed. The screw holes 56a–d, 58a–d and 60 define 0.1 inch (0.25 cm) deep threaded channels. All corners are preferably rounded to a radius of 0.015 inches (0.038). The parts may be constructed from 0.036 inch (0.0914 cm) cold-rolled steel stock. Once cut and formed, the parts are preferably electrostatically coated with a powder sealant and baked.

In view of the foregoing, it will be appreciated that the invention provides an aesthetically acceptable enclosure for housing a network access point in an interior building structure, such as a wall or ceiling of a hospital room. It should be understood that the foregoing relates only to the exemplary embodiments of the present invention, and that numerous changes may be made therein without departing from the spirit and scope of the invention as defined by the following claims.

The invention claimed is:

1. An enclosure for a computer device, comprising:
   a substantially sealed pan configured for placement within a structural member defining a substantially planar surface adjacent a room space and a building space, the pan defining an enclosure space for housing the computer device inside the building space, such that the pan does not extend substantially into the room space when the pan is received within the structural member, the pan further defining a smoke barrier between the room space and the building space, the pan comprising;
   a cable receptacle for receiving one or more cables for connecting the computer device to a computer network;
   a plate attachable to the pan for mounting the computer device within the enclosure space for maintaining a ventilation space between the computer device and the pan; and
   a ventilated cover for ventilation of the computer device attachable to the pan and comprising an outer surface that is substantially flush with the planar surface when the cover is attached to the pan such that the outer surface of the cover does not extend substantially into the room space when the cover is attached to the pan.

2. The enclosure of claim 1, further comprising an antenna receptacle for receiving an antenna cable for connection to the computer device from an antenna operable for wireless communications with the computer device and located exterior to the enclosure space.

3. The enclosure of claim 1, wherein:
   the structural member is an acoustical-panel ceiling comprising a grid of rails supporting a plurality of panels; and
   the pan is configure d for receipt on top of a portion of the rails configured to support one of the panels.

4. The enclosure of claim 1, wherein the antenna receptacle is configured to support the antenna within the room space.

5. The enclosure of claim 1, wherein the cable receptacle includes a first hole for a power cable and a second hole for a network communications cable.

6. The enclosure of claim 1, wherein the computer device is a wireless network access point.

7. The enclosure of claim 1, wherein the pan comprises impressed screw holes defining channels for receiving self-tapping screws for removably attaching the cover to the pan such that a technician may attach and remove the cover from the pan while the technician is substantially located within the room space.

8. The enclosure of claim 1, wherein the pan comprises impressed screw holes defining channels for receiving self-tapping screws for removably attaching the plate to the pan such that a technician may attach and remove the plate from the pan while the technician is substantially located within the room space.

9. The enclosure of claim 2, wherein the plate comprises keyhole-shaped mounting holes for receiving mounting pins attached to the computer device such that a technician may attach and remove the computer device from the enclosure while the technician is substantially located within the room space.

10. The enclosure of claim 1, wherein building space is an air-handling space for a building and the pan is desired to meet fire code regulations governing locating the enclosure within the air-handling space of the building.

11. The enclosure of claim 1, wherein:
    the cover is configured to attach to the pan in a plurality of positions; and
    the pan further includes a plurality of corner brackets, each corner bracket including an antenna receptacle configured to align with the antenna receptacle of the cover when the cover is attached to the pan in a particular one of the positions.

12. The enclosure of claim 1, wherein the structural member is a ceiling.

13. The enclosure of claim 1, where in the structural member is wall.

14. An enclosure for a wireless network access point configured for placement within a ceiling structure comprising a grid of rails supporting a plurality of panels defining a substantially planar ceiling surface between a room space and a building space, comprising:
    a pan configured for receipt on top of a portion of the rails configured to support one of the panels, the pan defining a rear surface, the pan defining an enclosure space for housing the network access point outside the room space such that the pan does not extend substantially into the room space when the pan is received within the ceiling structure, the pan substantially sealed to create a smoke barrier between the enclosure space and the building space, the pan comprising a cable receptacle for receiving a power cable and a network communications cable for connecting the network access point to a computer network;

a ventilated cover attachable to the pan and comprising an outer surface that is substantially flush with the planar ceiling surface when the cover is attached to the pan such that the outer surface of the cover does not extend substantially into the room space when the cover is attached to the pan;

a plate attachable to the pan for mounting the network access point within the enclosure space and maintaining a ventilation space between the network access point and the rear surface of the pan; and an antenna receptacle configured to support an antenna operable for wireless communications with the network access point and located within the room space.

15. The enclosure of claim 14, wherein:

the cover is configured to attach to the pan in a plurality of positions; and the pan further includes a plurality of corner brackets, each corner bracket including an antenna receptacle configured to align with the antenna receptacle of the cover when the cover is attached to the pan in a particular one of the positions.

16. The enclosure of claim 14, wherein:

the pan comprises impressed screw holes defining channels for receiving self-tapping screws for removably attaching the cover to the pan such that a technician may attach and remove the cover from the pan while the technician is substantially located within the room space;

the pan comprises impressed screw holes defining channels for receiving self-tapping screws for removably attaching the plate to the pan such that a technician may attach and remove the plate from the pan while the technician is substantially located within the room space; and the plate comprises keyhole-shaped mounting holes for receiving mounting pins attached to the network access point such that a technician may attach and remove the network access point from the enclosure while the technician is substantially located within the room space.

17. The enclosure of claim 14, wherein:

the building space is an air-handling space for a public building and the pan is designed to meet fire code regulations governing locating the enclosure within the air-handling space of the public building.

18. A method for positioning a network access point to communicate with a wireless terminal located with a room space, comprising the steps of:

placing a substantially sealed pan within a structural member within a building space defining a substantially planar surface adjacent the room space, the pan defining an enclosure space for housing the network access point outside the room space such that the pan does not extend substantially into the room space when the pan is received within the structural member and creates a smoke barrier between the room space and the building space;

attaching the network access point to the enclosure within the enclosure space;

extending a network communications cable from a computer network through the cable receptacle in the pan and connecting the network communications cable to the network access point;

attaching a ventilated cover to the pan, the cover comprising an outer surface that is substantially flush with the planar surface when the cover is attached to the pan such that the outer surface of the cover does not extend substantially into the room space when the cover is attached to the pan; and extending an antenna cable connected to the network access point through the enclosure; and connecting an antenna within the room space to the antenna cable, the antenna operable for wireless communications between the wireless terminal and the network access point.

19. The method of claim 18, further comprising the steps of:

attaching the network access point to a plate and attaching the plate to the enclosure and maintaining a ventilation space between the plate and the pan.

20. The method of claim 19, further comprising the steps of:

providing the pan with impressed screw holes defining channels for receiving self-tapping screws for removably attaching the cover to the pan such that a technician may attach and remove the cover from the pan while the technician is substantially located within the room space;

providing the pan with impressed screw holes defining channels for receiving self-tapping screws for removably attaching the plate to the pan such that a technician may attach and remove the plate from the pan while the technician is substantially located within the room space; and providing the plate with keyhole-shaped mounting holes for receiving mounting pins attached to the network access point such that a technician may attach and remove the network access point from the enclosure while the technician is substantially located within the room space.

* * * * *